United States Patent [19]

Moore et al.

[11] Patent Number: 4,664,948

[45] Date of Patent: May 12, 1987

[54] METHOD FOR COATING REFRACTORY MOLDS

[75] Inventors: John R. Moore, Florham Park; Stephen Maybaum, Short Hills, both of N.J.

[73] Assignee: Harborchem, Inc., Livingston, N.J.

[21] Appl. No.: 861,272

[22] Filed: May 9, 1986

Related U.S. Application Data

[60] Division of Ser. No. 690,862, Jan. 11, 1985, Pat. No. 4,602,667, which is a division of Ser. No. 525,423, Aug. 22, 1983, Pat. No. 4,530,722, which is a continuation-in-part of Ser. No. 478,457, Mar. 24, 1983, abandoned, which is a continuation-in-part of Ser. No. 433,959, Oct. 13, 1982, abandoned.

[51] Int. Cl.$^4$ .............................................. B44D 1/20
[52] U.S. Cl. .................................. 427/134; 106/38.22; 164/14; 164/33
[58] Field of Search .............................. 427/133, 134; 106/38.22; 164/14, 33

[56] References Cited

U.S. PATENT DOCUMENTS 4,319,925 3/1982 Brown .............................. 106/38.22
4,609,570 9/1986 Couleau et al. .................. 106/38.22

Primary Examiner—Lorenzo B. Hayes
Attorney, Agent, or Firm—Lerner, David, Littenberg, Krumholz & Mentlik

[57] ABSTRACT

Binder, filler, and refractory compositions and methods of using and making these compositions are disclosed. The binder composition comprises colloidal silica, a liquid material containing Si-OH groups, a solvent which is capable of solubilizing the liquid material and the colloidal silica, and at least one aprotic, non-ionic, non-metallic, organic compound which contains at least one element selected from P, S, B and N and which stabilizes the binder composition against self-gelling. The liquid material and the colloidal silica are present in a ratio by weight of from about 10:1 to about 1:10 respectively. The liquid material has at least about 20% by weight $SiO_2$. The colloidal silica contains at least about 15% by weight $SiO_2$. The solvent and the organic compound are present in amounts so as to solubilize the liquid material and the colloidal silica, to provide a binder composition which is stable against self-gellation, and to provide a binder composition which gels to a single phase.

8 Claims, No Drawings

METHOD FOR COATING REFRACTORY MOLDS

This is a division of application Ser. No. 690,862, filed Jan. 11, 1985, now U.S. Pat. No. 4,602,667, which is a division of application Ser. No. 525,423, filed Aug. 22, 1983, now U.S. Pat. No. 4,530,722, which is a continuation-in-part of application 478,457, filed Mar. 24, 1983, now abandoned, which in turn is a continuation-in-part of application Ser. No. 433,959, filed Oct. 13, 1982, now abandoned.

BACKGROUND OF THE INVENTION

The present invention relates to a binder composition for bonding molds, shapes, forms, etc. The invention also relates to refractory molds, shapes and forms incorporating such a binder and to methods of producing and using the binder and refractory compositions.

Alkyl silicates and colloidal silica sols, among others, are two of the kinds of materials that have been used in binder compositions in preparing investment casting molds and other refractory molds, shapes and forms. Attempts have been made to combine these two materials to obtain the advantageous properties of each while minimizing the less desirable aspects. For example, ethyl silicate provides high refractoriness and can be quickly chemically hardened or air hardened, but it provides low bond strength and limited stability in refractory slurries. Colloidal silica sols, on the other hand, provides high bond strength and good slurry stability but cannot be chemically gelled to a single phase and is only slowly air hardened.

In U.S. Pat. No. 3,961,968 a hybrid system of alkyl silicate and colloidal silica is disclosed in which a binder composition including both alkyl silicate and colloidal silica is produced by using various solvents including alcohols, ethylene glycol monoethers and diglycol diethers. This binder composition provided a desirable hybrid binder product when gelled, and at low ethyl silicate levels of about 8% a stable binder composition can be prepared which can be gelled to a single phase. On the other hand, the hybrid binder does not have good long term stability when higher ethyl silicate concentrations are employed, i.e., the binder of a higher ethyl silicate concentration gels by itself after a short period of time without the addition of any gelling agent. Since higher ethyl silicate levels provide certain desirable characteristics for binder and refractory compositions, it would be desirable to provide a composition which is stable against self-gellation but also which includes high amounts of ethyl silicate and which gels on command to a single phase.

An improvement of the hybrid binder system of U.S. Pat. No. 3,961,968 is disclosed in U.S. Pat. No. 4,289,803 in which phosphoric acid is included in the hybrid alkyl silicate/colloidal silica binder composition to produce a phosphosilicate composition, which is disclosed as enhancing mold strength and refractoriness of the binder composition. The binder compositions of U.S. Pat. No. 4,289,803 are stable at low ethyl silicate levels but not at high ethyl silicate levels.

SUMMARY OF THE INVENTION

It has now been found that a binder composition can be provided which has long term stability to self-gellation, which can include high amounts of alkyl silicate and which gells, stiffens and sets predictably on command at room temperature by heating or by adding a chemical gelling agent. By gelling on command, we mean that the binder composition can be caused to gel and set within about 2 minutes, preferably about 30 seconds to 1 minute by addition of a suitable gelling agent. These characteristics are provided by a composition in accordance with the present invention comprising colloidal silica, a liquid material containing Si—OH groups, a solvent which is capable of solubilizing the liquid material containing Si—OH groups and the colloidal silica, and at least one aprotic, non-ionic, non-metallic, organic compound which contains at least one element selected from the group consisting of P, S, B, N, and mixtures thereof and which stabilizes the binder composition against self-gelling. The colloidal silica and the liquid material containing Si—OH groups are present in a ratio by weight of from about 1:12 to about 75:1, e.g., from about 1:10 to about 10:1, respectively. The liquid material containing Si—OH groups contains at least about 20% by weight $SiO_2$, and the colloidal silica contains at least about 15% by weight of $SiO_2$. The solvent and the aprotic organic compound are present in amounts sufficient to solubilize the colloidal silica and the liquid material containing Si—OH groups, to provide a binder composition which is stable against self-gellation, and to provide a binder composition which gels to a single phase.

This binder composition can be mixed with refractory filler, i.e., larger aggregate and/or fine powders, to provide refractory compositions, which when gelled can be used, for example, as investment casting molds, as mold surface coatings, as refractory shapes, as refractory foams, as a parting agent for stools in the making of ingots in the steel industry, as a paint containing, e.g., Zn, for salt/brine resistant paints for ships, as a binder in combination with sand to fill holes quickly, for example, in an airport runway, as a binder for the tiles on the heat resistant surfaces of reentry rockets or ships, and as a component of a furan resin binder system. The binder and filled compositions of the invention provide a combination of very desirable properties to industry in that the compositions are stable against self-gelling for long periods of time, but they can include high alkyl silicate contents and can be made to gel on command to a single phase. Thus, the compositions of the present invention can be packaged for later use in predetermined concentrations to provide refractory and binder composition of advantageous and known characteristics, e.g., dimensional and strength characteristics. The compositions of the invention can also include organic compounds which decompose to provide for example boron or phosphorus oxides, thus providing an added refractory on the molecular level which become part of the chemical and physical structure of the gelled composition.

In a preferred embodiment of the present invention, the binder composition prepared therefrom comprises from about 1 to about 60% by weight, more preferably from about 2 to about 40%, e.g., from about 5 to about 40% by weight of ethyl silicate which has been hydrated and which contains from about 28 to about 60% by weight of $SiO_2$; from about 5 to about 75% by weight, more preferably from about 5 to about 60%, e.g., from about 5 to about 40% by weight of colloidal silica containing from about 15 to about 60% by weight of $SiO_2$; from about 0.5 to about 50% by weight, more preferably from about 1 to about 20%, e.g., from about 0.5 to about 10% by weight of dimethyl methyl phosphonate; and from about 10 to about 93.5% by weight, more preferably from about 20 to about 60%, e.g., from about 20 to about 55% by weight of a solvent selected from diethylene glycol monoethyl ether, propylene glycol monomethyl ether or propylene glycol monopropyl ether.

DETAILED DESCRIPTION OF THE INVENTION

As noted above, the binder composition of the present invention includes as its basic elements a liquid material containing Si—OH groups, colloidal silica, an appropriate solvent for the liquid material and the colloidal silica, and at least one aprotic, non-ionic, non-metallic, organic compound which contains at least one element selected from the group consisting of P, S, B, N, and mixtures thereof and which stabilizes the binder composition against self-gelling.

Any of the conventional liquid materials containing Si—OH groups known in the art for binder compositions can be employed in the present invention. Preferably, the liquid materials are silicate esters, e.g., alkyl silicate materials, which have been hydrated. Such liquid materials should contain at least about 20% by weight $SiO_2$, and more preferably, from about 28% to about 60% by weight of $SiO_2$. Suitable liquid materials containing Si—OH groups include organooxysilanes (orthosilicic acid esters), and poly(organooxysiloxanes) (polysilicic acid esters) which have been hydrolyzed, see, for example, Chapter 11 of "Chemistry and Technology of Silicones" by Walter Noll, Academic Press, 1968. The liquid materials can be simple molecules, but are usually polymeric in nature. Examples of some commercially available alkyl silicates suitable for use in the present invention include Ethyl Silicate 40 available from Stauffer Chemical Company and other ethyl and propylsilicates available from Stauffer Chemical Company, Kay-Fries, Inc., and Union Carbide Corporation.

Any conventional colloidal silica can be employed in the present invention, including basic silica sols and acidic silica sols. Since the addition of base can upset the stability of the hydrolyzed alkyl silicates if the pH is maintained for too long a period at about pH 5-7, the use of basic silica sol must be carefully performed so that the pH of composition resulting from the addition of the basic silica sol to the hydrolyzed alkyl silicate does not cause gellation of the hydrolyzed alkyl silicate and therefore of the binder composition as a whole. Preferably, the colloidal silica contains at least about 15% by weight of $SiO_2$, and more preferably, from about 15% to about 60% by weight $SiO_2$. Examples of suitable commercial colloidal silica compositions include Nalcoag 1129 and Nalcoag 1034-A (which are water based colloidal silica sols) available from Nalco Chemical Company, Nyacol 2034DI available from Nyacol Corporation, and Ludox LS available from E. I. du Pont de Nemors and Company. Acidic silica sols and silica sols in which the particles themselves are non-charged are preferred for use in the present invention.

A solvent is used in the composition of the present invention which will solubilize both the liquid material containing Si—OH groups and the colloidal silica. A preferred group of solvents are the water-miscible organic solvents, especially aliphatic alcohols having from 1 to 4 carbon atoms and glycol ethers. Examples of suitable solvents include ethanol, isopropanol, propylene glycol monomethyl ether, propylene glycol monopropyl ether, and diethylene glycol monoethyl ether. Propylene glycol monomethyl ether is particularly preferred in situations calling for a high volatility solvent, while diethylene glycol monoethyl ether is preferred for situations requiring lower volatility solvents.

The binder composition of the present invention also includes at least one aprotic, non-ionic, non-metallic organic compound which contains at least one element from the group consisting of P, S, B, N, and mixtures thereof and which stabilizes the binder composition against self-gelling. The organic compounds are preferably liquid at room temperature. The organic portions of the molecules are not critical so long as the organic compound along with the solvent solubilizes the colloidal silica and the liquid material containing Si—OH groups and results in a binder composition which is stable against self-gellation and which gels to a single phase. In this regard, it has been found that organometallic compounds in general are probably too ionic in nature or too insoluble to be suitable for use in the invention. Likewise, protic materials such as butyl acid phosphate or materials such as trimethyl phosphite (which acts as a fairly strong Lewis base) are not suitable for use in the invention. Suitable P containing organic compounds for use in the present invention include, for example, fully esterified phosphate, pyrophosphate, and phosphonate esters. The B containing organic compounds suitable for use in the invention include, for example, fully esterified borate and pyroborate esters. Suitable S containing organic compounds include, for example, dialkyl or diaryl sulfoxides, while sulfate esters may be too ionic in nature to be suitable. Dialkyl or diaryl amides of alkanoic acids are examples of organic compounds containing N which would be suitable for use in the present invention. Preferably, the organic portions of the compounds are alkyl straight or branched chain groups containing from 1 to 6 carbon atoms, or are aryl groups containing 6 to 8 carbon atoms, e.g., phenyl. Preferred organic compounds are the organic compounds containing P which when oxidized results in useful refractory oxides thereof. Examples of suitable organic compounds containing P, B, S and/or N include dimethyl methyl phosphonate (DMMP), triethyl phosphate, tributyl borate, dimethyl sulfoxide and dimethyl formamide. It is believed that the organic compound stabilizes the binder composition by inhibiting self-gellation while still allowing gelling by use of a gelling agent or by drying.

The binder composition of the invention containing DMMP has been found to be particularly advantageous. A binder composition containing 21% by weight Ethyl Silicate 40, 4.7% by weight water, 37% by weight diethylene glycol monoethyl ether, 30% by weight Nalcoag 1129, 7.2% by weight DMMP, and 0.1% by weight concentrated HCl prepared in accordance with the present invention has been found by the conventional pyrometric cone equivalent (PCE) test to provide a PCE value of 32–33, whereas a binder composition without the DMMP only provided a PCE value of approximately 29. Similar PCE values are expected for other compositions of the invention. This characteristic of the binder composition of the present invention is considered highly advantageous because it means that the binder composition of the invention can be used at higher temperatures than conventional binder compositions without DMMP. For example, this characteristic makes the binder composition of the invention suitable for use in casting metal alloys requiring molten temperatures above 3000° or even 3100° F.

The binder composition of the present invention contains the colloidal silica and the liquid material containing Si—OH groups in a ratio by weight of from about 1:12 to about 75:1, e.g., from about 1:10 to about 10:1 respectively. Preferably, the binder composition contains from about 1 to about 60% by weight, e.g., from about 2 to about 60% by weight of the liquid material containing Si—OH groups, and more preferably, from about 2 to about 40% by weight, e.g., from about 5 to about 40%. The binder composition also preferably contains from about 5 to about 75% by weight, e.g., from about 5 to about 55% by weight colloidal silica, and more preferably, from about 5 to about 60% by weight, e.g., from about 5 to about 40%.

It has also been found that very good results are obtained with relatively low amounts of the liquid material containing Si—OH groups. For example, a composition prepared from a mixture of primary components consisting essentially of 4.1% by weight ethyl silicate 40, 4.1% by weight DMMP, 36.3% by weight dimethyl methyl phosphonate, and 55.3% by weight of Nyacol 2034 (colloidal silica with 34% $SiO_2$ and 66% $H_2O$), when used as a wash for a sand mold provided a heavy steel casting surface as good as an "as cast" surface. Because of the low amounts of silicate material employed, such compositions are easy to manufacture and are also very economical. Although it can be found that the liquid material containing Si—OH groups is a necessary part of the binder composition of the invention, the lower percentage weight limit of such liquid material has not been determined exactly. On the other hand, because 4.1% by weight performs well, it is believed that a weight percentage as low as 1% and perhaps even lower can be employed while still providing good results as, e.g., an investment casting wash.

The solvent and the organic compound are present in the binder composition of the present invention in amounts sufficient to solubilize the colloidal silica and the liquid material containing Si—OH groups, to provide a binder composition which is stable against self-gellation, and to provide a binder composition which gels to a single phase. Preferably, the binder composition is stable against self-gellation for at least about 3–9 months, more preferably at least about 1 year or more. Suitable concentrations for the aprotic organic compounds in the binder compositions of the present invention include from about 0.5% to about 50% by weight of the composition, and preferably, from about 1% to about 20% by weight, e.g., from about 5 to about 12%. Preferably, the composition of the present invention includes from about 10% to about 93.5% by weight, e.g., from about 20 to about 55% by weight of solvent. Typically, when more aprotic organic compound is employed less solvent and more preferably from about 20 to about 60% is necessary.

It is sometimes advantageous to include a thickening agent in preparing refractory compositions with the binder composition of the invention. Preferably, a minimum amount of thickening agent is employed so as not to upset the system. Typically, amounts lower than about 0.1% by weight, preferably from about 0.01 to about 0.1% by weight of thickening agent are employed in preparing refractory compositions. Suitable thickening agents include conventional non-ionic thickening agents such as the hydroxyalkyl cellulose materials, for example, hydroxypropyl cellulose, e.g., Klucel H available from Hercules. The thickening agent imparts a soft settling characteristic to the refractory composition so that the settling of the added refractory, e.g., zircon powder, from the composition is inhibited.

Various other materials can be included in the binder composition of the present invention, e.g., the reaction products from the hydration of the alkyl silicate, surfactants, and viscosity modifiers to provide a "paint" to which filler particles can be added to provide refractory coatings. The amounts and types of such other materials vary according to the purpose of the additive and the ultimate application of the binder composition.

The binder composition can be prepared by any method which will result in a stabilized mixture or composition containing these four basic elements. In one method, a strong inorganic acid such as concentrated sulfuric acid or hydrochloric acid is mixed with water. Preferably, the water is distilled and deionized, and the amount of water present is about the amount needed to hydrate and ethyl silicate, i.e., large excesses of water are avoided. The acid should be present so that the final pH of the binder composition is at a pH of from about 1 to about 3. An appropriate solvent for the alkyl silicate and the colloidal silica is then added, e.g., isopropyl alcohol, diethylene glycol monoethyl ether and/or propylene glycol monomethyl ether. This mixture is agitated and an alkyl silicate such as ethyl silicate is then added slowly and the temperature is controlled, preferably between 15° C. and 31° C. During this part of the reaction, the alkyl silicate is being hydrated. This hydration reaction is exothermic and therefore can be monitored by use of a thermometer. When the system stops giving off heat, the reaction is essentially complete. However, in this method the hydrated alkyl silicate solution is preferably allowed to "rest" for a period of time, e.g., 24 hours or longer, to stabilize the hydrated alkyl silicate thereby produced. After this period of rest, the organic compound, preferably DMMP, is added with agitation and then over a period of time the colloidal silica is slowly added. This method results in a very stable binder composition.

In a preferred embodiment, the silicate ester, the concentrated acid, the solvent and the aprotic organic compound can be placed in a reactor and the colloidal silica can be added slowly to the above reactants, e.g., by using a glass funnel with a petcock. Preferably, the reaction mixture is formed by blending the silicate ester with the solvent and/or aprotic organic compound and adding the acid thereto. The acid acts as a catalyst for the hydration reaction and is present in a sufficient amount to provide a final pH of from about 1 to about 3 for the resulting binder composition. The colloidal silica provides substantially all of the water necessary to hydrate the silicate ester. Preferably, the reactor is capable of being temperature controlled, e.g., water cooled. The temperature is preferably maintained from about 15° to about 31° C., and during the entire reaction, the reactants are agitated, e.g., with a mechanical stirrer. The colloidal silica is dripped into the reactants at a slow rate, e.g., to provide a reaction time from 1–2 hours. This assures hydration of the alkyl silicate without gelling the resulting binder composition. In the initial stages of the reaction, the colloidal silica is hydrated. This hydration usually occurs in the first 25% of the total reaction time. Again, during the hydration period an exotherm usually occurs which is readily discernable by using a thermometer. Thus, the temperature of the reactants can be used to follow the hydration reaction.

The binder composition could also be prepared by starting with a hydrated alkyl silicate and just adding the aprotic organic compound and colloidal silica thereto as described above. One such hydrated alkyl silicate is available from Stauffer Chemical Company under the name Hydrated Ethyl Silicate Type E-5.

The binder composition of the present invention can be used alone, for example, as a corrosion resistant adhesive, or can be used to prepare refractory compositions for numerous applications, e.g., as investment casting molds, as a refractory coating for the plastic film in the well-known V-process, as coatings for sand molds, as refractory shapes or as refractory foams. These refractory compositions basically comprise the binder composition described above and filler particles, e.g., larger aggregate and/or fine powders.

Additionally, the refractory compositions can include a predetermined quantity of an additive selected from the group consisting of polyvinyl acetate, polyvinyl alcohol, gums, and clay for green strength. A surfactant can also be included for wetting refractory powders during the preparation and use of the compositions for coating surfaces, e.g., of sand molds.

The selection of the filler particles depends on the ultimate use to be made of the refractory composition as is conventional in the art. The filler particles can change and improve many of the properties of the binder including the refractoriness, stability, crystallization, strength, thermal shock resistance, permeability, and toughness. Thus, if an investment casting mold is being prepared, combinations of fine powders and larger aggregate will be most likely employed as is conventional in the art, while powdered filler particles, for example, zircon, ground to 100 mesh or finer will most likely to be employed if a coating for the surface of a sand mold is contemplated. Addition of graphite can provide a non-oxidizing type binder system for use, for example, in making Ti metal castings, where the molten Ti might normally be oxidized by the oxygen in the binder system. Examples of suitable filler particles include refractory and non-refractory fillers. Examples of non-refractory fillers include polystyrene (e.g., beads), mica, talc, iron oxide and boric acid. Suitable refractory particles include zircon, silica, olivine, clay, alumina-silicate, graphite, fused silica, alumina, chromite, fibrous-alumina silicate, magnesia, or quartz. Combinations of these filler materials can also be used.

The filler particles can be mixed with the binder composition of the present invention in any amount suitable to provide a composition for the desired purpose as is conventional in the art. Typically, the filled compositions contain from about 5 to 50% by weight of the binder composition.

The binder composition and filled composition in accordance with the present invention can be gelled in any conventional manner. For example, the binder and filled compositions can be gelled by employing a gelling agent such as ammonium hydroxide, MgO or ammonia gas. The compositions can also be gelled by drying as is conventional in the art.

The binder compositions of the present invention bond together, without heat, the filler particles. The filled compositions of the invention are very advantageous because they can be gelled on command, but are themselves stable against gellation and can be employed in many applications in either fired or non-fired conditions.

Preferably, the filled compositions are refractory compositions gelled in the desired shape, e.g., by the "lost wax process" or in the form of a refractory shape or foam as described below. The gelled, shaped refractory composition can be used as is or can be fired at a temperature sufficient to oxidize the aprotic organic compounds therein to complex refractory oxides and/or volatilized materials.

As noted above, the refractory compositions of the invention can be used in conventional processes for preparing investment casting molds, coatings for molds such as sand molds, refractory shapes, and refractory foams. These processes are conventional in the art and need not be detailed here. However, since the present invention can be employed in such process, they are briefly discussed below as they relate to the invention.

A number of important characteristics are important in investment casting molds:

(1) They should be able to withstand high temperatures, since some commercially important metals become fluid at temperatures above about 1000° F. and iron and steel above 2000° F.

(2) The mold should also conform to specifications which approach those normally encountered with machine metal parts.

(3) The molds should faithfully reproduce the shape and dimensions of the pattern of the mold; and therefore the binder composition used in preparing the mold should have sufficient strength so that the refractory composition can withstand the physical handling forces from start to finish of the mold forming process.

(4) The mold should be able to be generated quickly at ambient temperatures with sufficient binder strength after forming to withstand the dewaxing stresses encountered when the pattern is removed.

(5) The dewaxed mold should also be able to withstand long periods of storage under ambient conditions without deterioration.

These characteristics are provided by the binder and refractory compositions of the present invention. In particular, the refractory compositions of the present invention can withstand temperatures of PCE 32–33 and have sufficient strength to also withstand the "lost wax process" for preparing investment casting molds.

Investment casting molds are generally prepared by the "lost wax process". In this process, a wax mold is prepared in the shape desired for the ultimate metal casting. Binder is applied to this wax mold by dipping the mold into a refractory slurry such as a refractory composition of the invention. Filler particles such as refractory particles are then applied to the slurry coating on the wax mold and the binder composition is gelled. The wax mold is then again dipped into the refractory slurry, more filler particles applied, and the binder composition gelled again. These steps are repeated until the desired characteristics of the refractory investment casting mold are achieved. Normally, the size of the filler particles increases from the inside to the outside of the casting mold.

The wax mold is then dewaxed by processes again conventional in the art. The refractory slurry of the invention provides sufficient strength to the mold to withstand the stresses during this dewaxing step.

The dewaxed investment mold prepared in accordance with the invention can be stored for long periods of time. It can then be used in a conventional investment casting process. During the casting process, the binder and refractory compositions must withstand even greater stresses.

In preparing a fired investment mold, the dewaxed investment mold is first fired to burn out temperatures of about 1800° F. This burn out accomplishes three things:

(1) it rids the mold cavity of all residual organic matter;
(2) it oxidizes and recrystallizes all refractory materials to their most stable high temperature form; and
(3) it heats the mold to decrease thermal shock from the molten metal during pour.

Thus, as is conventional in the art, due consideration must be given during formulation of the binder to compensate for the dimensional changes which take place within the binder during the burnout period. Some mold failures are characterized by such things as fractures, warpage, passage restrictions, low strengths and permeability problems. To some degree, these failures have been traced to refractory binders. The present invention provides good binder reliability.

In order to avoid the above problems, the binder in the investment mold should withstand high temperature handling when the mold, which is normally at about 1800° F., is moved from the burnout position, which is generally upside down, to the casting position, which is right side up. All of this requires rigidity under conditions which are prone towards plasticity because of glass formation.

The binder should also withstand the rigors of the pour. This means that the mold cavity should be able to capture molten metal as it falls from the furnace or ladle and to withstand the two shocks encountered in such a fall. Thus, the binder should be able to withstand the mechanical shock of being hit with a falling mass having a specific gravity of from 5 to 9 and the thermal shock of being hit with a very hot mass having a temperature difference of up to about 1000° F. or greater.

The binder should further decrepitate after the metal solidifies so as not to place any undue mechanical stresses on the hot metal during its cooling stage, when it is shrinking and is prone to hot tears from the stronger molding media.

The binder should not adhere to the metal surfaces after shake-out. If it does, the casting will have such defects as burn-ins, penetrations or other surfaces blemishes. In other words, it should break away clean.

The binder and refractory compositions of the present invention provide these desirable results for investment casting molds.

In the case of sand mold casting, similar but less stringent mold requirements are needed than those discussed above. Also, because there is a parting line and the pattern can be removed from the mold intact prior to closing and pouring, there are no dewaxing or burnout stages, and the casting specifications are not as demanding. The sand mold is also normally at ambient temperature when employed in casting. Generally, the strength of the sand mold is only a small fraction of the strength of the investment mold but is much more massive.

Casting molten metal into sand molds is a widely used and accepted method of shaping parts. However, it does have several limitations inherent in the process.

Sand molds are made from sand, the grains of which have a size of from about 30 to 100 per linear inch. When these grains are compacted into a hard mass and held together with a suitable binder the surface of the mold cavity (which is exposed to the molten metal and against which this metal will solidify) will impart to the metal the same smoothness as the grains of sand of which it is composed. In terms of metal surfaces, this is not smooth.

Several things happen when the molten metal is poured into the sand mold cavity. At first, there is the dynamic charge of the fluid as it pours into the void. Then, there is a "quite time" of the fluid as it rests against the sand walls and loses temperature. Finally, there is the act of solidification, wherein the fluid takes on the solid shape of the mold cavity, and its entire outside surface is in intimate contact with the sand surface of the mold cavity. This surface to surface contact is known as the metal/mold interface.

During the first dynamic stage when the mold cavity is being filled, the rushing fluid has a tendency to pull off loose grains of sand from the mold surface and carry them along in the liquid metal. This causes inclusions in the metal as well as damage to the metal/mold interface. If erosion is severe enough, the dimensions of the casting can be affected as well as the integrity of the metal. Obviously, a sand mold surface with enough strength to withstand this erosive effect is required.

During the second static liquid stage when the fluid metal has filled the cavity and is now quietly losing heat through the metal/mold interface, the mold surface is being subjected to severe heat conditions. It must be remembered that prior to the molten metal entering the mold cavity, the sand surface was at ambient temperature of perhaps 80° F. Now only a few seconds later, the interface is at the molten metal temperature of perhaps 2800° F., with the thermal gradient being very steep and sweeping away fast from the metal. This is heat shock of the worst kind. The interface is thus subjected to high stresses, and in many cases the interface does not stand up under such conditions. When failure of the mold surface at the interface occurs, it results in quite a few unique metal conditions. These are known by rather picturesque names: rat-tail, scab, penetration, vain, burn-in, orange-peel, nitrogen embrittlement, cill, cold shut, porosity, and blow just to name a few. They all result in added difficulties and expenses to the foundryman.

During the third solidification stage when the metal is becoming solid and taking on the shape and surface aspect of the mold cavity—now altered by erosion and heat-shock, the defects listed above are locked into the casting.

If improvements are to be made in the casting aspect relative to the weaknesses of the metal/mold interface, it is obvious from the above that these improvements must be made to the mold surface before the mold is closed and the molten metal poured into the cavity. The present invention provides such desirable interface characteristics.

The refractory composition in accordance with the invention formed from an admixture of the above discussed ingredients may be combined with a refractory powder, as has been previously mentioned, to produce a slurry-like mixture for treating mold surfaces sometimes referred to as a wash. Preferably, the refractory powder is selected from a group consisting of zircon, silica, alumina-silicate, graphite, fused silica, alumnina, chromite, fibrous-alumina silicate, magnesia, or combination thereof. These refractory powders preferably are ground to a size smaller than about 100 mesh.

The slurry produced can be applied to coat the sand mold surface of the cavity, e.g., by brush, spray, dip, or swab methods. This coated surface is then allowed to dry with or without heat being applied, i.e., the refractory composition is gelled in place on the surface of the mold. The mold surface so coated has properties well suited to functioning as a metal/mold interface.

For example, the fine powdered refractories are much smaller than the voids between the sand grains on the surface of the mold. Therefore, the powdered refractories tend to deposit in these voids as well as lay on the top surface of the uppermost sand grains. By so filling the voids, a smooth surface results that is highly refractory and impervious to penetration by either the liquid metal or the metal vapors.

Furthermore, with the present invention this wash affects more than just the top surface of the mold. If a cross section of the mold surface is examined under magnification, it can be seen that the fine powdered refractory has penetrated to three or more sand grains down into the molding media. This means that the voids on the mold surface of the interface have been filled in with a high quality refractory to a depth of three or more sand grains.

In addition, the liquid phase of the binder composition of the invention penetrates and bonds the mold sand mass from ¼ inch to several inches deep, depending upon the characteristics of the molding media. As a result of this deep mold interface bonding, a hard mold surface results, which can withstand considerable thermal and mechanical shock.

By use of the invention in the form of a refractory composition coating on sand molds, the sand is bound tightly together. Therefore, the sand will not erode off the surface to become entrapped in the metal casting as an inclusion. Further, because of the hardness, there is less tendency for the surface of the mold to fracture, thus eliminating expansion defects normally associated with a weak mold wall interface. As an added advantage, because the mold wall is smooth as a result of the refractory powder filling in the gaps between sand grains, the solidification of the metal takes place against a smooth surface and results in a smooth metal casting.

In another embodiment of the invention, the binder composition of the invention is used in a process known in the art as the V-process for preparing sand molds for large metal castings. As is noted above, the V-process is conventional in the art and basically comprises the steps of: providing a pattern for the product to be produced; placing an organic plastic film over the pattern so that the plastic film basically conforms to the shape of the pattern, e.g., via heating the film to provide a good elasticity and pulling a vacuum on the plastic through the mold pattern; coating the exposed surface of the plastic film with a refractory wash; drying the refractory wash; placing a vacuum flask so that it fits over and onto the plastic film and covers the pattern, the vacuum flask having a first opening suitable for receiving the pattern and a second opening for the addition of sand to the flask; adding sand to the flask through the second opening so that the sand is in contact with the plastic film; vibrating the sand to compact and conform the sand to the shape of the pattern, closing the second opening so that at least a partial vacuum can be drawn on the sand in the flask; pulling at least a partial vacuum on the flask and the sand until the sand is held in place against the refractory wash on the plastic film opposite the pattern; releasing the pattern from the plastic film, e.g., by releasing the vacuum pulled on the plastic film through the pattern. This process provides a portion of a mold that can be used along with other similar molds in combination to provide large metal castings as are known in the art. The refractory washes which have been used in the past to coat the plastic have not provided an effective high temperature vacuum seal in certain instances when the metal for casting is placed in contact with the mold. For example, when a large mold is involved or when the mold has sharp angles, etc., the heat of the molten metal vaporizes and/or decomposes the plastic film. Because the prior refractory washes employed did not provide an effective vacuum barrier, the vacuum seal created by the plastic was broken. Because the vacuum is now broken prior to effective setting of solid metal, the sand broke away and defects occurred in the casting.

It has now been found that the refractory compositions of the present invention can be used in place of prior refractory washes to provide a superior metal/mold interface as well as a good vacuum seal upon burning away of the plastic film during the casting step of the V-process. Thus, the refractory composition of the present invention maintains a good vacuum in the sand and prevents drop off of sand due to lack of vacuum at crucial areas. Thus, the problems of surface finish and sand drop off are considerably alleviated with the present invention. Thus, another embodiment of the invention provides a process comprising the steps of providing a pattern for the product to be produced; placing an organic plastic film over the pattern so that the plastic film conforms to the shape of the pattern; coating the exposed surface of the plastic film with a binder and/or refractory composition comprising refractory particles and a binder composition, said binder composition being in accordance with the invention as described above; and gelling said binder and/or refractory composition. The remaining steps of the V-process described above can also be performed as is conventional in this art.

In still another embodiment, the refractory composition of the present invention can also be used to make fired or non-fired refractory shapes.

In current practice, refractory shapes are generally manufactured by first mixing the refractory materials with water to form the shape desired. Some drying is then entailed to make the green ware ready for firing, which is the final step. Although the ingredients are not too expensive, the firing can be very expensive, especially in the case of high temperature refractories.

As an alternative to firing in the making of refractory shapes, several types of binder have been proposed and/or used that set at room temperatures, thereby eliminating the firing step in production. Some of the current materials used for this purpose are:

(1) Sodium Silicate: This has sodium ions in its matrix and therefore will form low temperature liquid glass phase in the binder which severly restricts its application in high temperature work.

(2) Calcium Aluminate: Although an improvement on portland cement, which is a poor refractory cement, this binder is limited to about the 2700° F. range depending on the manufacturer. The present invention will act as a binder above 3100° F. when desired.

(3) Various phosphates: These can be very useful in refractory work below 3000° F. The present invention will act as a binder above 3100° F.

(4) Ethyl Silicate: Although this binder has the advantage of having only silicon dioxide as the refractory adhesive, it does a relatively poor job of bonding to the refractory aggregates. Therefore, shapes bonded with ethyl silicate tend to be weak.

(5) Colloidal Silica Sol: This binder forms its strength by drying, and in large thick masses, it both takes a long time and shrinks. However, because the bond is pure silicon dioxide, the final bond is a good one for high temperature work.

(6) Hybrid Colloidal Silica/Ethyl Silicate (e.g., the hybrids disclosed in U.S. Pat. Nos. 3,961,968 and 4,289,803 discussed above): Such a hybrid lacks the advantage of having an aprotic organic compound, as is present in the formulation of the invention, to provide wider variability in the binder composition and contents as well as to add stability to the solution.

Non-fired refractory shapes are useful to the industrial community, because they make possible fast equipment repairs, accurate pattern contact curing, lower cost field erection, automated in-plant fabrication, energy savings, and a host of specialized saving and advantages inherent to each need. Therefore, the closer the non-fired refractory attributes come to the needs of the users, the more non-fired shapes there will be in use by industry. The compositions of the invention will provide such useful characteristics.

In another application, the refractory compositions of the present invention can be used to prepare non-fired refractory foams.

There has been a considerable amount of industrial demand for foam type materials, either materials foamed in place or bulk foamed. This foam material can act as insulation, packing, filters, strainers, screens, decorations, structures, containers, etc. In other words, these foams have found a broad range of usefulness. In line with the above, it has been found useful to employ all manners of porous materials including foams to strain liquids when temperatures do not exceed a few hundred degrees F. As the temperature goes up, however, this straining job becomes more difficult, until at the temperatures at which most commercial metals are liquid, there are very few materials available, if any, to do the straining job. The present invention provides a way to make a continuous refractory foam of any pore size desired and of any outside shape and dimension desired.

A refractory foam in accordance with the present invention can be made, for example, by forming a slurry refractory composition in accordance with the invention using any refractory powder or combination of powders, such as zircon, silica, olivine, chromite, mullite, magnesium oxide, aluminum oxide, graphite, clay, etc. Next, a piece of continuous porous organic foam is provided having the pore size desired. The foam is cut and trimmed to the outside dimensions and shape desired in the finished refractory foam. The foam is dipped into the slurry so as to cover all the organic surfaces and drained so that the interior passage ways are not closed or blocked. The piece is then gelled with a gelling agent or set aside to cure and harden, or baked at low temperatures to accelerate the cure. Once cured, the refractory foam is ready for use as a preferred high temperature metal strainer. For example, it can be placed in a stream of metal to retain the entrained solids without burning away.

The following examples are presented to illustrate, but not to limit, the compositions and processes of the present invention.

EXAMPLE 1

A refractory binder in accordance with the present invention was prepared by utilizing the ingredients listed below:

| INGREDIENTS | PARTS BY WEIGHT |
| --- | --- |
| Water (distilled, deionized) | 1.8 |
| Sulfuric Acid, Concentrated | 0.12 |
| Diethylene glycol monoethyl ether (DE) | 52.16 |
| Ethyl Silicate 40[1] | 8.0 |
| Dimethyl methyl phosphonate (DMMP) | 8.64 |
| Colloidal Silica Sol[2] | 30.0 |

[1]Remet Chemical Company.
[2]Nalcoag 1129 from Nalco Chemical Company

The water was placed into a water cooled reactor and the sulfuric acid was added. Then, the DE was added and agitation turned on. Next, the ethyl silicate is slowly added and the temperature monitored. The entire reaction is kept at between 20° C. and 24° C. During this part of the reaction, the ethyl silicate is hydrated. The DE is in the system to bring the oleophilic ethyl silicate into solution with the water. Only enough water is added to the system to hydrate the ethyl silicate. The reaction is exothermic, and therefore can be monitored. When the system stops giving off heat, the reaction is essentially complete. The agitator is then turned off and the solution is allowed to sit for 72 hours so as to stabilize the hydrated ethyl silicate produced.

After 72 hours, the agitator is turned on again and the dimethyl methyl phosphonate is added. Mixing is performed for 1 minute. Then, over a period of time of about 6 minutes the colloidal silica sol was added. The resulting composition is mixed for several minutes and then stored.

This binder composition has been found to be stable against self-gellation for at least 6 months. The composition also gelled on command by addition of a gelling agent such as ammonium hydroxide to provide a single phase gel.

EXAMPLE 2

A refractory binder composition in accordance with the present invention was prepared employing the following ingredients:

| INGREDIENTS | PARTS BY VOLUME |
| --- | --- |
| Sulfuric Acid, Concentrated | 0.33 ml |
| Distilled Water | 15.25 ml |
| Diethylene glycol monoethyl ether | 275.00 ml |
| Ethyl Silicate 40[1] | 40.00 ml |
| Colloidal Silica[2] | 151.5 ml |
| DMMP | 38.25 ml |

[1]Remet Chemical Company
[2]Nalcoag 1129 from Nalco Chemical Company

These ingredients were mixed basically in accordance with the procedure described in Example 1 above except that DMMP was added at the start with the DE. The resulting composition was found to be very stable against self-gellation even in view of the high ethyl silicate levels employed. The composition gelled on command with ammonium hydroxide to provide a single phase gel.

EXAMPLE 3

The procedure described in Example 1 above was repeated to prepare four additional binder compositions A, B, C and D employing the following ingredients:

| INGREDIENTS | PARTS BY WEIGHT | | | |
|---|---|---|---|---|
| | A | B | C | D |
| DMMP | 8.64 | 8.64 | 8.64 | 8.64 |
| $H_2O$ | 2.48 | 3.38 | 4.05 | 4.73 |
| ES40 | 11 | 15 | 18 | 21 |
| DE | 48.71 | 44.11 | 40.66 | 37.21 |
| Nalcoag 1129 | 30 | 30 | 30 | 30 |
| $H_2SO_4$ | .13 | .14 | .15 | .16 |

All of the compositions A, B, C and D were stable against self-gellation and gelled on command by addition of ammonium hydroxide to provide a single phase Interstab Zirco Drier Catalyst 24% was added to Composition A above and Zirconium Cem-All 24% was added to Composition B above. In each case, a small fall-out of solids occurred, probably because of a supersaturation, ionic character or insolubility.

EXAMPLE 4

A refractory composition, e.g., for coating a mold can be prepared from the following ingredients:

| INGREDIENTS | PARTS BY WEIGHT |
|---|---|
| Zircon Flour | 75 |
| Polyvinyl Alcohol[3] | 0.5 |
| Binder Composition from Example 1 | 24.5 |
| Surfactant[4] | 0.01 |

[3]Vinol available from Air Products Chemicals, Inc.
[4]S505LF Poly-tergent surfactant available from Olin Corporation The above ingredients are mixed in a reactor with an agitator and a water bath with the entire mix maintained at from 20° to 30° C. at all times. 24.5 grams of the refractory binder from Example 1 is placed into the reactor and 75 grams of a powdered zircon flour ground to 200 mesh is then mixed in. Mixing continues for 20 minutes, at which time 0.5 grams of polyvinyl alcohol and 0.1 grams of the surfactant are added. After a further 20 minutes of mixing, the mixing is stopped and the coating stored for use.

EXAMPLE 5

A binder composition in accordance with the present invention was prepared from the following ingredients:

| INGREDIENTS | PARTS BY WEIGHT |
|---|---|
| Ethyl Silicate 40 | 12 |
| DMMP | 2.5 |
| Hydrochloric Acid (concentrated) | 0.1 (40 drops) |
| IPA (Isopropyl alcohol) | 51.9 |
| Colloidal Silica Sol (Nalcoag 1129) | 33.5 |

All the ingredients except the colloidal silica sol were placed in a reaction vessel equipped for agitation, and a glass funnel with a petcock was positioned above the reactor. The colloidal silica was placed in the glass funnel. A thermometer was located permanently contacting the reactants and readable from outside the reaction. The reactors were capable of being water cooled. With all apparatus in place, the colloidal silica was dripped into the reactor so as to give a relative reaction time of from 1–2 hours. During the entire addition of colloidal silica sol, the reactor is kept in a constant state of agitation. The first stage of the reaction with the introduction of colloidal silica is the hydration of the ethyl silicate in the presence of the mutual solvent. The water is provided by the colloidal silica sol. This hydration occurs over a period of about the first 25% of the reaction time. During the hydration period, exotherm occurs which is readily discernable through the otical thermometer. The termination of hydration is indicated through the peaking of temperature. After all of the colloidal silica sol is added, the resultant composition is capable of being used as a binder.

The resultant composition can be used as a binder material for investment casting molds, as a binder material for mold washes, as a parting agent for steel ingot stools and as a base for a corrosion resistant paint.

The resultant composition was mixed with zircon flour of 325 mesh size in a ratio of 1:3, respectively. This refractory composition was applied as a coating to an organic binder sand mold and was gelled or cured thereon by the application of heat. The resultant mold wash coating the core proved to be ceramic in quality, being very hard and deep penetrating and "rang" clearly like a bell.

EXAMPLE 6

The procedure of Example 5 was repeated, except that the following ingredients were employed and the water was dripped into the ethyl silicate, PM, DMMP and acid prior to addition of the colloidal silica:

| INGREDIENTS | PARTS BY WEIGHT |
|---|---|
| Ethyl silicate 40 | 377 |
| PM (propylene glycol monomethyl ether) | 479 |
| DMMP | 170 |
| Water (distilled) | 60 |
| $H_2SO_4$ (concentrated) | 1.5 (60 drops) |
| Colloidal Silica Sol (Nalcoag 1129) | 832 |

The resulting composition has been stable against self-gelling at ambient temperature for at least 2 months to this point.

EXAMPLE 7

The procedure of Example 5 was repeated, except that the following ingredients were used and it took about 5 hours to add the colloidal silica sol:

| INGREDIENTS | PARTS BY WEIGHT |
|---|---|
| Ethyl Silicate 40 | 20 |
| PM | 22.1 |
| DMMP | 10 |
| HCl (concentrated) | 15 drops |
| Nalcoag 1034 | 47.9 |

The resulting composition was stable for 2½ months. The composition was gelled to provide an investment casting shell into which was poured 316 Series stainless steel at 2975° F. The shell did not crack and the molten metal did not run out and provided as excellent quality casting.

EXAMPLE 8

The procedure of Example 5 was repeated, except that the following ingredients were employed:

| INGREDIENTS | PARTS BY WEIGHT |
|---|---|
| Ethyl Silicate 40 | 20 |
| EE (ethylene glycol monoethyl ether) | 37 |
| Tributyl Borate | 10 |
| Hydrochloric Acid (concentrated) | 0.1 (20 drops) |
| Colloidal Silica Sol (Nalcoag 1034) | 32.9 |

The above composition provided a binder composition which has been stable against self-gelling at least 3 weeks to this point.

EXAMPLE 9

The procedure of Example 5 was repeated, except that the following ingredients were employed:

| INGREDIENTS | PARTS BY WEIGHT |
|---|---|
| Ethyl Silicate 40 | 20 |
| Dimethylsulfoxide | 10 |
| PM (propylene monomethyl ether) | 22 |
| Hydrochloric Acid (concentrated) | 0.1 (20 drops) |
| Colloidal Silica Sol (Nalcoag 1034) | 47.9 |

The above composition provides a binder composition which has been stable against self-gelling for at least 1½ months to this point.

EXAMPLE 10

The procedure of Example 5 was repeated, except that the following ingredients were employed:

| INGREDIENTS | PARTS BY WEIGHT |
|---|---|
| Ethyl Silicate 40 | 20 |
| Dimethylformamide | 10 |
| PM | 22 |
| Hydrochloric Acid (concentrated) | 0.1 (20 drops) |
| Colloidal Silica Sol (Nalcoag 1034) | 47.9 |

The above composition provides a binder composition which was stable against self-gelling for at least one month.

EXAMPLE 11

The procedure of Example 5 was repeated, except that the following ingredients were employed:

| INGREDIENTS | PARTS BY WEIGHT |
|---|---|
| Ethyl Silicate 40 | 20 |
| Triethylphosphate | 10 |
| EE | 37 |
| Hydrochloric Acid (concentrated) | 0.1 (20 drops) |
| Colloidal Silica Sol (Nalcoag 1034) | 32.9 |

The above composition provides a binder composition which has been stable against self-gelling for at least three weeks to this point.

EXAMPLE 12

Basically the same procedure as described in Example 6 above was employed, except that instead of dripping the colloidal silica sol into the reactor vessel via the glass funnel, small portions of colloidal silica sol were added by hand over a period of approximately 1¼ hours. The following ingredients were employed:

| INGREDIENTS | PARTS BY WEIGHT |
|---|---|
| Ethyl Silicate 40 | 20 |
| DMMP | 10 |
| EE | 22.1 |
| Hydrochloric Acid (concentrated) | 15 drops |
| Colloidal Silica Sol (Nalcoag 1034) | 47.9 |

This composition was stable for at least three months and was used successfully to make investment casting shells. The relatively small amount of EE at 22.1% reduced the stability significantly and the relatively large amount of colloidal silica increased the water which also reduced stability.

COMPARATIVE EXAMPLE 13

A binder composition employing phosphoric acid instead of DMMP and a relatively high ethyl silicate concentration was also prepared from the following ingredients:

| INGREDIENTS | VOLUME % |
|---|---|
| Phosphoric acid (85%) | 5.00 ml |
| Distilled Water | 2.29 ml |
| Ethyl Alcohol (95%) | 37.90 ml |
| Ethyl Silicate 40[1] | 43.91 ml |
| Colloidal Silica Sol[2] | 10.90 ml |

[1]Remet Chemical Company
[2]Nalcoag 1129 from Nalco Chemical Company

Half of the phosphoric acid and all of the distilled water and ethyl alcohol were combined and the ethyl silicate was added thereto. The hydration of the ethyl silicate was completed in about an hour. The colloidal silica was then added. After about 20 minutes, the second half of the acid was then added. After about 2-3 hours this solution gelled on its own.

COMPARATIVE EXAMPLE 14

A binder composition including phosphoric acid and a relatively low concentration of ethyl silicate was prepared using the ingredients listed below. The water acid and DE were placed in a reaction vessel. The ES-40 was added slowly over a period of about 2 hours. Then, the colloidal silica sol was slowly mixed in over about 4 minutes:

| INGREDIENTS | VOLUME % |
|---|---|
| Phosphoric acid (85%) | 25.0 ml |
| Distilled Water | 8.5 ml |
| DE | 275.0 ml |
| Ethyl Silicate 40[1] | 40.0 ml |
| Colloidal Silica Sol[2] | 151.51 ml |

[1]Remet Chemical Company
[2]Nalcoag 1129 from Nalco Chemical Company

The composition was found to be stable for at least nine months, but as noted above, it contained only 8 volume % ethyl silicate and therefore a low percentage of silica in the overall composition.

COMPARATIVE EXAMPLE 15

The procedure of Example 5 was repeated, except that the following ingredients were employed:

| INGREDIENTS | PARTS BY WEIGHT |
|---|---|
| Ethyl Silicate 40 | 20 |

-continued

| INGREDIENTS | PARTS BY WEIGHT |
|---|---|
| TMP (trimethyl phosphite) | 10 |
| PM | 22 |
| Hydrochloric Acid (concentrated) | 0.1 (drops) |
| Colloidal Silica Sol (Nalcoag 1034) | 47.9 |

This composition had a three phase separation, gelled in three days, and was not useful as a binder.

COMPARATIVE EXAMPLE 16

Basically the same procedure as described in Example 5 above was employed, except that instead of dripping the colloidal silica sol into the reactor vessel small portions of colloidal silica sol were added by hand over a period of approximately 1¼ hours. The following ingredients were employed:

| INGREDIENTS | PARTS BY WEIGHT |
|---|---|
| Ethyl Silicate 40 | 20 |
| BAP (butyl acid phosphate) | 10 |
| PM | 22 |
| Hydrochloric Acid (concentrated) | 0.1 (30 drops) |
| Colloidal Silica Sol (Nalcoag 1034) | 47.9 |

This material was milky in color, was opaque and had the appearance of gelled colloidal silica. Eventually, a separate solid phase settled at the bottom.

COMPARATIVE EXAMPLE 17

200 ml of the composition of Example 12 above was mixed with a solution of 2 grams of chromium acetylacetonate in 20 ml of propylene glycol monomethyl ether. Also, 200 ml of the composition of Example 12 above was separately mixed with a solution of 2 ml of methylcyclopentadienyl manganese tricarbonyl in 20 ml of propylene glycol monomethyl ether. The compositions containing the chromium or manganese compounds resulted in gels making the compositions unsuitable for use as binder compositions.

EXAMPLE 18

The procedure of Example 5 above was repeated, with the following changes and ingredients:

| INGREDIENTS | PARTS BY WEIGHT |
|---|---|
| Ethyl Silicate 40 | 4.1 |
| PM | 36.3 |
| DMMP | 4.1 |
| HCl | .1 |
| Nyacol 2034 (Colloidal Silica with 34% SiO$_2$ and 66% H$_2$O) | 55.3 |
| Klucel H (hydroxypropyl cellulose) | .1 |

The Klucel H was added with agitation to the prepared binder composition after hydration of the Ethyl Silicate 40 was completed and all of the colloidal silica had been added to the reactor. The propylene glycol monoethyl ether was added in two parts. The initial amount of about 24.1 parts by weight in preparing the binder compositions. The remaining 12.2 parts were added after the Klucel H was added to clean up some cloudiness that had developed upon addition of the Klucel H.

The resultant binder composition (9.5 grams) was mixed with zircon flour (24.5 grams) to provide a refractory composition. This refractory composition was "painted" in two coats onto the surface of a sand mold by flooding the area to assure penetration into the sand mass. The first coat was dried before application of the second coat. This wash provided an excellent surface for heavy steel casting. Moreover, application of the wash was quick and easy and the wash composition is relatively economical because of the low ratio of the costly ingredients in the wash.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

What is claimed is:

1. A method for coating a refractory mold comprising the steps of (1) providing a coating composition including a binder composition comprising colloidal silica, liquid material containing Si—OH groups, a solvent capable of solubilizing the liquid material and the colloidal silica, and at least one aprotic, non-ionic, non-metallic organic compound which contains at least one element from the group consisting of phosphorus, sulfur, boron, nitrogen and mixtures thereof and which stabilizes the binder composition against self-gelling; wherein said colloidal silica and said liquid material are present in a ratio by weight from about 1:10 to about 10:1 respectively, said liquid material contains at least about 20% by weight of SiO$_2$, and said colloidal silica contains at least about 15% by weight of SiO$_2$; and wherein said solvent and organic compound are present in amounts sufficient to solubilize the liquid material and the colloidal silica, to provide a binder composition which is stable against self-gellation, and to provide a binder composition which gels to a single phase; (2) applying the coating composition to a refractory mold surface; and (3) gelling the coating composition on the surface of the refractory mold.

2. A method according to claim 1, wherein said binder composition comprises from about 2 to about 60% by weight of liquid material containing Si—OH groups, from about 5 to about 55% by weight of said colloidal silica, from about 20 to about 50% by weight of said solvent, and from about 0.5 to about 50% by weight of said organic compound.

3. A method according to claim 2, wherein said binder composition comprises from about 5 to about 40% by weight of ethyl silicate that has been hydrated, said ethyl silicate containing from about 28% to about 60% by weight of SiO$_2$; from about 5 to about 40% by weight of colloidal silica containing from about 15 to about 60% by weight of SiO$_2$; from about 0.5 to about 12% by weight of dimethyl methyl phosphonate; and from about 20 to about 55% by weight of a solvent selected from diethylene glycol monoethyl ether, propylene glycol monomethyl ether or propylene glycol monopropyl ether.

4. A method according to claim 1, wherein the ratio of said colloidal silica and said liquid material is from about 1:10 to about 10:1, respectively.

5. A method according to claim 1, wherein the binder composition comprises from about 1 to about 60% by weight of said liquid material containing Si—OH groups, from about 5 to about 75% by weight of said colloidal silica, from about 10 to about 93.5% by weight of said solvent, and from about 0.5 to about 50% by weight of said organic solvent.

6. A method according to claim 1, wherein the binder composition comprises from about 5 to about 40% by weight of ethyl silicate that has been hydrated, said ethyl silicate containing from about 28% to about 60% by weight of $SiO_2$; from about 5 to about 60% by weight acidic colloidal silica containing from about 15 to about 60% by weight of $SiO_2$; from about 5 to about 20% by weight of dimethyl methyl phosphonate; and from about 20 to about 60% by weight of a solvent selected from diethylene glycol monoethyl ether, propylene glycol monomethyl ether, or propylene glycol monopropyl ether.

7. A method according to claim 1 including mixing refractory particles with said binder composition to provide said coating composition.

8. A method according to claim 7 wherein said refractory particles comprise zircon.

* * * * *